US009143505B2

(12) United States Patent  
Lu et al.

(10) Patent No.: US 9,143,505 B2
(45) Date of Patent: Sep. 22, 2015

(54) IMAGE COLLECTION BASED INFORMATION SECURITY METHOD AND SYSTEM

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 206 days.

(21) Appl. No.: 13/700,466

(22) PCT Filed: Nov. 30, 2011

(86) PCT No.: PCT/CN2011/083196
§ 371 (c)(1),
(2), (4) Date: Nov. 28, 2012

(87) PCT Pub. No.: WO2013/004065
PCT Pub. Date: Jan. 10, 2013

(65) Prior Publication Data
US 2013/0160103 A1    Jun. 20, 2013

(30) Foreign Application Priority Data

Jul. 1, 2011  (CN) .......................... 2011 1 0185195

(51) Int. Cl.
*G06F 21/31* (2013.01)
*H04L 29/06* (2006.01)
*H04L 9/32* (2006.01)

(52) U.S. Cl.
CPC ............ *H04L 63/0838* (2013.01); *G06F 21/31* (2013.01); *H04L 9/3247* (2013.01); *H04L 9/3271* (2013.01); *H04L 63/08* (2013.01); *H04L 63/18* (2013.01); *H04L 2209/56* (2013.01)

(58) Field of Classification Search
None
See application file for complete search history.

(56) References Cited

U.S. PATENT DOCUMENTS

| 8,024,576 B2 * | 9/2011 | Gargaro et al. ............... 713/183 |
| 8,151,364 B2 * | 4/2012 | Hewitt et al. .................. 726/30 |
| 8,661,254 B1 * | 2/2014 | Sama ............................ 713/168 |
| 2002/0101988 A1 * | 8/2002 | Jones ............................ 380/54 |
| 2008/0212771 A1 * | 9/2008 | Hauser .......................... 380/44 |
| 2009/0313687 A1 * | 12/2009 | Popp et al. ....................... 726/9 |
| 2012/0084571 A1 * | 4/2012 | Weis et al. ..................... 713/184 |
| 2012/0272307 A1 * | 10/2012 | Buer ................................ 726/9 |
| 2013/0124855 A1 * | 5/2013 | Varadarajan et al. ......... 713/155 |

OTHER PUBLICATIONS

HOTP: An HMAC-Based One-Time Password Algorithm, IETF RFC 4226, Dec. 2005.*

* cited by examiner

*Primary Examiner* — Jung Kim
*Assistant Examiner* — Janusz Kusyk
(74) *Attorney, Agent, or Firm* — Hammer & Associates, P.C.

(57) ABSTRACT

An image collection based information security method and system is disclosed. The method includes a server side receiving a first transaction data sent by a client side and generating a second transaction data with the first data. The server converts the second data into an image, and sends the image to the client. A dynamic token collects the image, pre-processes, and converts the image into a third transaction data, and displays the third data for user's confirmation. The token generates and displays a second dynamic password according to the third data. The client receives the second password input by a user and sends same to the server. The server receives the second password and generates a first dynamic password, determines whether the first password is identical to the second password; if yes, the authentication is successful and the transaction is executed; if no, the transaction is cancelled.

15 Claims, 3 Drawing Sheets

IMAGE COLLECTION BASED INFORMATION SECURITY METHOD AND SYSTEM

TECHNICAL FIELD

The invention relates to information security field and in particularly, to an image collection based information security method and an image collection based information security system.

PRIOR ART

Challenge/Response identity authenticating system is a system based on such a mechanism that an authentication server sends to a client side a "Challenge" string different in each time of authentication, and the client side responses to it upon receiving the Challenge string.

In the prior art, an information security system, such as an online banking system and a Challenge/Response identity authenticating system, is widely applied, covering many fields. A dynamic token inputs a challenge code and generates a 6 or 8 bits of random number as a dynamic password with a built-in algorithm, and the dynamic password is valid only for one time and is an unpredictable random number combination generated with a specific algorithm which ensures authentication safety of a transaction and a log-on process, and with the dynamic password, it is not necessary to update a password regularly, therefore the method is safe and easy.

When using a current information security system, the inventors find at least one shortcoming that transaction data needs to be input manually when using a dynamic token on a client side and is easy to be input by mistake, resulting in that the operation is not executed automatically and the transaction is not operated normally.

SUMMARY OF THE INVENTION

In order to solve shortcoming in the prior art, the invention provides an image collection based information security method and system, which improve security of an online transaction, apply a convenient and quick transaction method, and meet a purpose of automatic operation with a solution as below.

An image collection based information security method comprises

Step 1, a server side receiving first transaction data sent from a client side, and generating second transaction data with the first transaction data;

Step 2, the server side converting the second transaction data into a transaction image, and sending the transaction image to the client side;

Step 3, a dynamic token collecting the transaction image, pre-processing the transaction image and converting the transaction image into third transaction data, and displaying the third transaction data for a user's confirmation;

Step 4, the dynamic token generating and displaying a second dynamic password with the third transaction data;

Step 5, the client side receiving the second dynamic password input by the user, and sending the second dynamic password to the server side; and Step 6, the server side receiving the second dynamic password, generating a first dynamic password with the second transaction data, and determining whether the first dynamic password is identical to the second dynamic password, if yes, the authentication being successful and the transaction being executed; if no, the operation being cancelled.

After Step 3, the method further comprises that the dynamic token determines whether confirmation information input by a user is received within a predetermined waiting period, if yes, Step 4 is executed; if no, the current operation is cancelled.

The first transaction data in Step 1 refers to a transaction time, a transaction amount, a transaction account number, a transaction address, a transaction password, and/or a random number.

In Step 1, the server side extracts critical data from the first transaction data with a predetermined rule, and generates second transaction data by the critical data.

In Step 2, it further comprises that the server records and stores a transaction image conversion time.

In Step 3, the pre-processing refers to that the collected transaction image is converted by the dynamic token into a digital image with a first process, and the digital image is converted into the third transaction data with a second process.

In Step 6, the method further comprises that the server side computes a time difference between the time for receiving the second dynamic password and the time for generating the transaction image, and determines whether the time difference does not exceed a predetermined time period, if yes, the transaction is executed; if no, the operation is cancelled.

In Step 4, the generating the second dynamic password further comprises combining a built-in seed key with the third transaction data by a predetermined rule, performing hash operation on the combined data to generate a fix-sized digest value, and subtracting data from the digest value with the predetermined rule, and taking a decimal number of the subtracted digest value as the dynamic password.

In Step 6, the method further comprises that the server side computes a time difference between the time for receiving the second dynamic password and the time for generating the transaction image, and determines whether the time difference does not exceed a predetermined time period, if yes, executes the transaction; if no, cancels the operation.

Step 6 further comprises that the server side sends an authentication result to the client side, and if the authentication result is failure, the client side prompts the user of re-inputting the password; if no, the operation is ended.

An image collection based information security system comprises a dynamic token, a client side, and a server;

the dynamic token being configured to collect a transaction image, convert the transaction image into a third transaction data, generate a second dynamic password by computing according to the third transaction data, and display the second dynamic password;

the client side being configured to communicate with the server, receive or send out the transaction data and dynamic password being input by a user; and the server being configured to communicate with the client side, receive a first transaction, generate a second transaction data with the first transaction data, convert the second transaction data into a transaction image, compute the second transaction data to generate a first dynamic password, receive the second dynamic password, and determine whether the first dynamic password is identical to the second dynamic password.

The dynamic token comprises a second receiving module, a displaying module, a second image converting module, a second computing module, a transaction image collecting module, a first storage module, and a power module; in which the second receiving module is configured to receive confirmation information input by the user;

the transaction image collecting module is configured to collect the transaction image displayed on the client side screen, for the dynamic token;

the second image converting module is configured to preprocess and convert the transaction image into the third transaction data for the dynamic token;

the second computing module is configured to generate the second dynamic password by computing the third transaction data;

the displaying module is configured to display the dynamic password and the third transaction data;

the first storage module is configured to store a seed key; and the power module is configured to provide working power for the dynamic token.

The dynamic token comprises a determining module being configured for the dynamic token to determine whether confirmation information input by a user has been received within a predetermined waiting period.

The server comprises a second interface module, a third receiving module, a third sending module, a conversion module, a first computing module, a second determining module, a second storage module, and a transaction module;

the second interface module is configured to connect the server and the client side;

the third receiving module is configured to receive the first transaction data and the second dynamic password;

the first computing module is configured to generate the second transaction data with the first transaction data, and generate a first dynamic password with the second transaction data;

the conversion module is configured for the server to convert the second transaction data into a transaction image;

the second determining module is configured to determine whether the first dynamic password is identical to the second dynamic password;

the third sending module is configured to send the transaction image to the client side; send the dynamic password authenticating result to the client side; and further determine whether the time difference is within the authentication time period predetermined by the server;

the time setting module is configured to set a transaction authenticating time for the server;

the second storage module is configured to store user information and a seed key; and the transaction module is configured to execute the transaction.

The server further comprises a time authenticating module for computing a time difference between the time for receiving the second dynamic password and the time for generating the transaction image, and determining whether the time difference does not exceed the predetermined time period.

There exists advantages of the invention, i.e., improving security of online transactions, and reducing error rate of the information by automatic operation, and simplifying authentication process.

DESCRIPTIONS OF THE ACCOMPANYING DRAWINGS OF THE INVENTION

DETAILED EMBODIMENTS OF THE INVENTION

Descriptions of the preferred embodiments are detailed as below in accompany with the drawings. It is noted that the below descriptions are just exemplary, not a limit to scope and application of the invention.

Embodiment 1

Embodiment 1 provides an image collection based information security method, including Steps as below:

In Step 101, a server side receives a first transaction data sent by a client side and generates a second transaction data with the first transaction data;

Specifically, the server side generating the second transaction data by the first transaction data includes:

the server side extracts a critical data from the first transaction data and generates the second transaction data with the critical data;

For example, the first transaction data is <?xml version="1.0" encoding="UTF-8"?><T><D><M><k>Beneficiary's name:</k><v>Zhang San</v></M><M><k>Amount:</k><v>123.23</v></M></D><E><M><k>Swift number:</k><v>12345678</v></M></E></T>

Correspondingly, the critical data extracted by the server side includes:

Beneficiary name: Zhang San

Amount: 123.23

The first transaction data may also include a transaction time, a transaction amount, a transaction account number, a transaction address, and a transaction password as a critical data.

The sever side may take the critical data as the second transaction data, or take the first transaction data directly as the second transaction data without extracting the critical data; or generate the second transaction data by adding other data to the critical data. Preferably, the server side extracts the critical data and adds a transaction ID to it as the second transaction data.

Correspondingly, the second transaction data generated by the server side includes:

Beneficiary Name: Zhang San

Amount: 123.23

Transaction ID: 10000

In Step 102, the server side converts the second transaction data into a transaction image, and sends the same to the client side.

The transaction image is displayed on a screen of the client side for a user to collect with a dynamic token.

Specifically, the server side also records a conversion time of the transaction image.

That the server side converts the second transaction data into the transaction image includes that the server side converts the second transaction data into the transaction image with a predetermined data processing rule.

Specifically, that the server side converts the second transaction data into the transaction image with a predetermined rule includes mapping each bit of the second transaction data to 2*2 color blocks. Specifically, 0 is represented by a white block and 1 is represented by a black block.

A transaction image is obtained by stitching all color blocks in sequence and exchanging lines at every two bytes (16 bits).

For example, the embodiment adds a location block at the upper left corner, the upper right corner, and the lower right corner, which specifically is a 3*3 color block with white central dots and other black dots.

Figure 1:
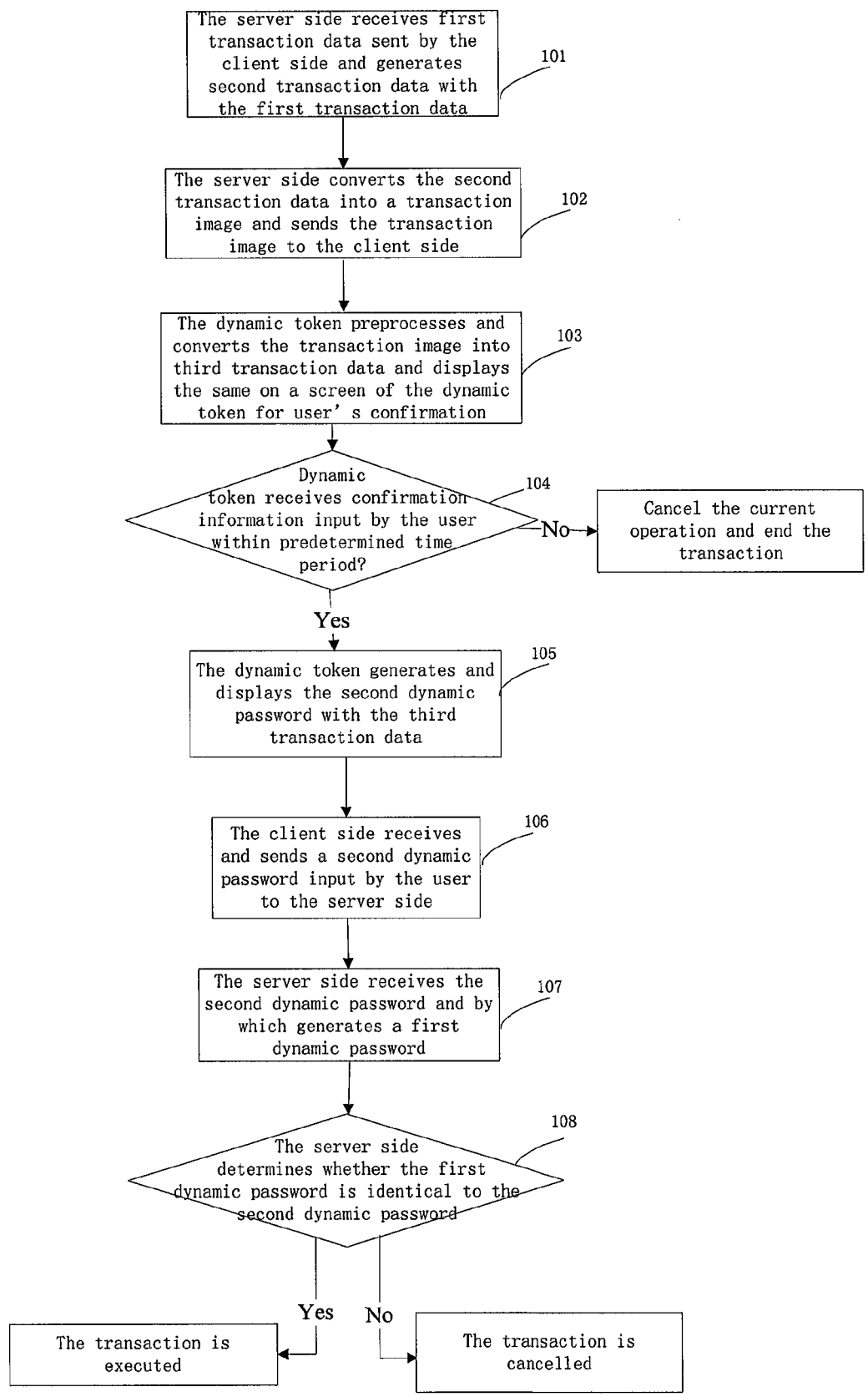
FIG. 1 illustrates a flow chart of an image collection based information security method according to Embodiment 1 of the invention.
Figure 2:
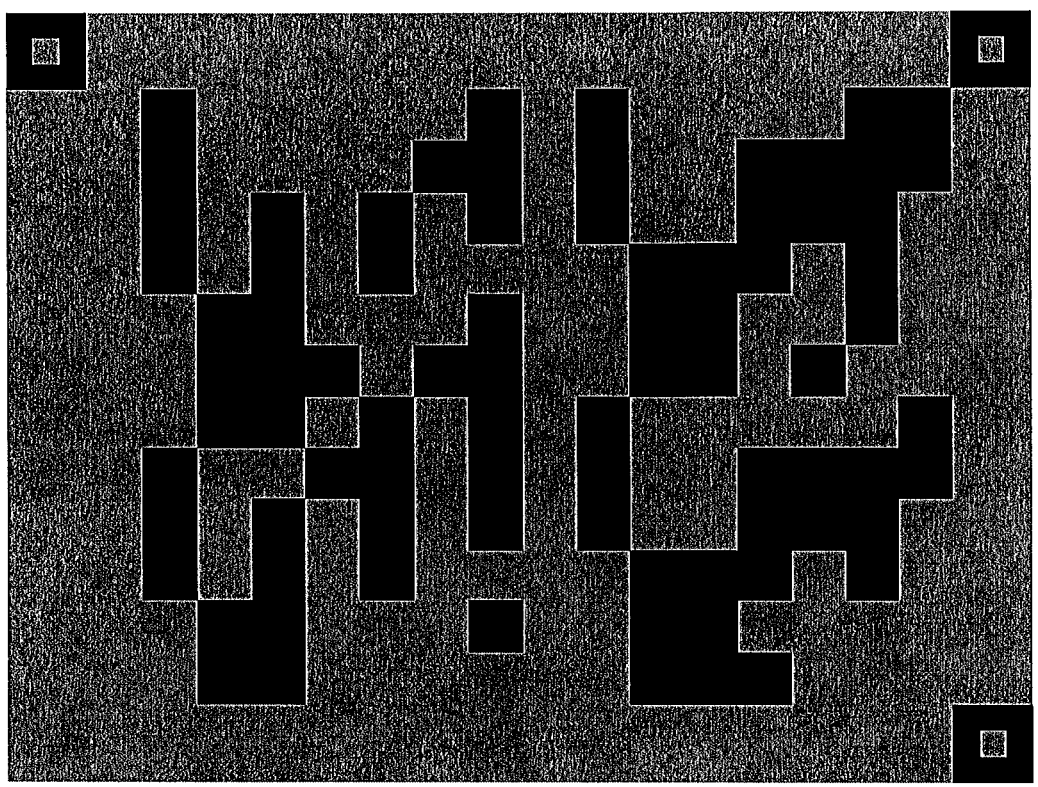
FIG. 2 illustrates a diagram of a transaction image according to Embodiment 1 of the invention.
Figure 3:
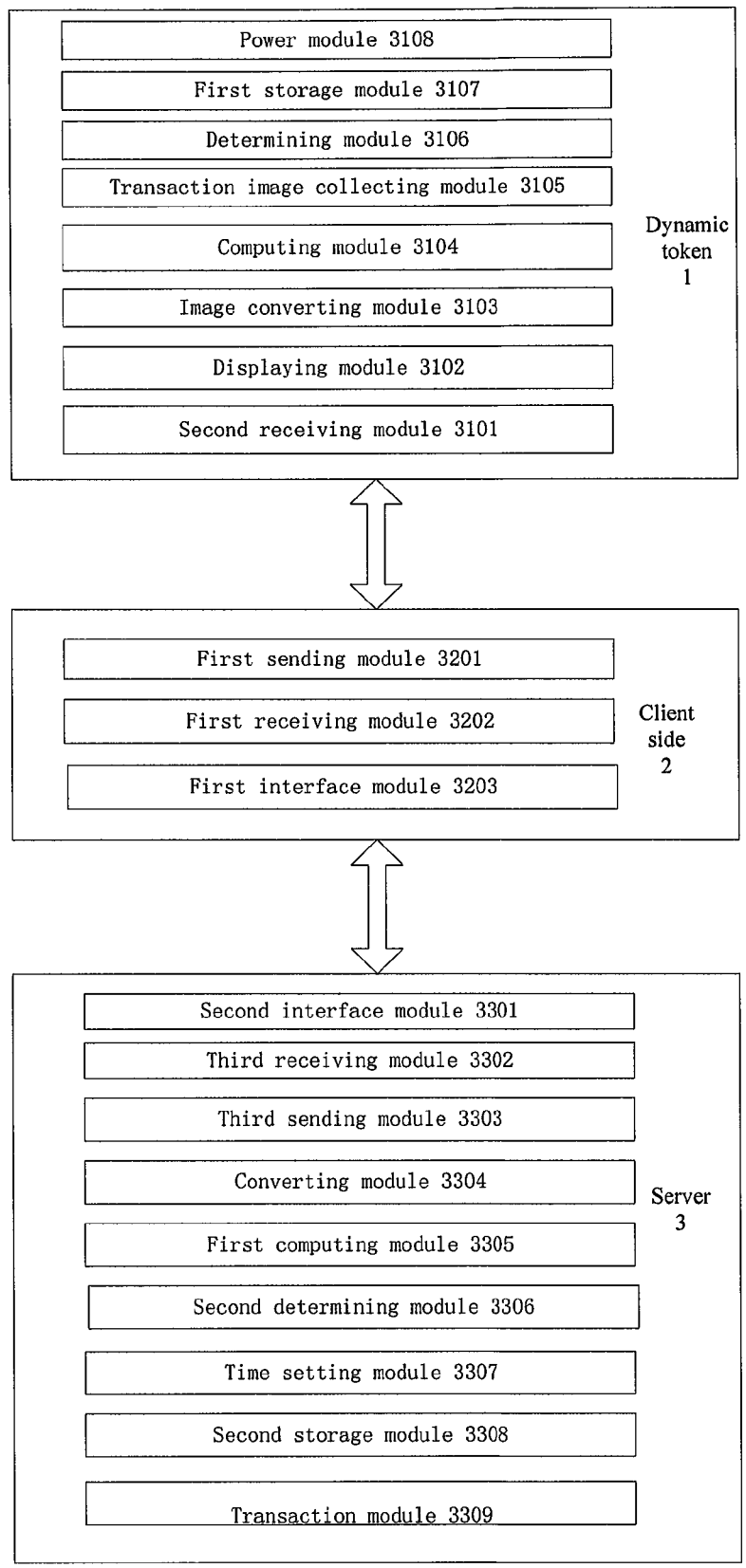
FIG. 3 illustrates a functional structural chart of an image collection based information security system according to Embodiment 2 of the invention.

The converted transaction image is illustrated in FIG. 3.

In Step 103, the dynamic password collects the transaction image displayed on the client side screen, preprocesses the transaction image, converts the same into a third transaction data, and displays the third transaction data on a screen of the dynamic token for user's confirmation;

The method for converting the transaction image into the third transaction data by the dynamic token is a reverse process of the method for generating the transaction image with the second transaction data by the server side in Step 102, and thus details of it are omitted.

In Step 104, the dynamic token determines whether confirmation information input by the user has been received within a predetermined time period, if yes, Step 105 is executed; if no, the operation is cancelled and the transaction is ended.

Specifically, the confirmation information input by the user refers to a key-pressing action.

In Step 104, the predetermined waiting period is 60 seconds.

In Step 105, the dynamic token generates and displays a second dynamic password with the third transaction data.

Specifically, the second dynamic password is displayed on a screen of the dynamic token for inputting into a client side by the user.

That the dynamic token generates the second dynamic password with the third transaction data includes that the dynamic token combines a built-in seed key with the third transaction data according to a predetermined rule, performs hash operation on the combined data to generate a fix-sized message value, subtracts data from the message value with a predetermined rule, and takes a decimal number of the subtracted data as the dynamic password.

In Step 106, the client side receives the second dynamic password input by the user and sends the same to the server side.

In Step 107, the server side receives the second dynamic password, and generates the first dynamic password according to the second transaction data.

The server side generates the first dynamic password with a method which is just the same as that in Step 105, and therefore details of the generation are omitted. The seed key used by the server side is pre-registered on the server side by the user.

Specifically, the server side also includes recording the time of generating the transaction image, correspondingly computing a time difference between the time of receiving the second dynamic password and the time of generating the transaction image before generating the first dynamic password, and determining whether the time difference does not exceed the predetermined time period, if yes, going to Step 108; if no, the transaction being overtime and cancelling the operation in Step 102.

Specifically, the server side may also generate the first dynamic password in Step 102.

In Step 108, the server determines whether the first dynamic password is identical to the second dynamic password, if yes, the authentication is successful and the transaction is executed; if no, the operation is cancelled.

In Step 105, the dynamic token may also generate the second dynamic password according to an additional dynamic factor, such as times of pressing a key and the current time etc., a seed key and the third transaction data. Correspondingly, the server side increases or decreases the current dynamic factor within a predetermined value range, generates a series of dynamic passwords, compares the series of dynamic passwords with the second dynamic password, and if one matches with the second dynamic password, the authentication is successful and the current dynamic factor is updated; if no, the authentication is failed.

The dynamic factor may be a time-based dynamic factor, such as time of a timer, or an event-based dynamic factor, such as times of pressing a key.

Preferably, the server side also sends the authentication result to the client side. If the authentication result indicates a failure, the client side prompts the user of re-inputting the password, otherwise, the operation is ended.

Embodiment 2

Embodiment 2 provides a structural diagram of an image collection based information security system, including a dynamic token 1, a client side 2, and a server 3.

The dynamic token 1 is configured to collect a transaction image, convert the transaction image into third transaction data, generate a dynamic password with the transaction data, and display it on a screen.

The client side 2 is configured to communicate with the server, send and receive the transaction data, and the dynamic password input by a user.

The server 3 is configured to communicate with the client side, receive the first transaction data, generate the second transaction data with the first transaction data, convert the second transaction image into a transaction image, send the transaction image into the client side, generate a first dynamic password with the second transaction data, receive the second dynamic password, and determine whether the first dynamic password is identical to the second dynamic password, if yes, execute the transaction; if no, cancel the operation.

The dynamic token 1 specifically includes a second receiving module 3101, a displaying module 3102, an image converting module 3103, a computing module 3104, a transaction image collecting module 3105, a determining module 3106, a first storage module 3107, and a power module 3108.

The second receiving module 3101 is configured to receive confirmation information input by the user, which specifically is a key or a key related circuit. The user inputs the confirmation information by a key.

The receiving module may also be a switch and a biometric identifying device, such as a fingerprint identifying device, etc.

The displaying module 3102 is configured to display the dynamic password and the transaction image.

The image converting module 3103 is configured to preprocess and convert the transaction image into the transaction data.

The computing module 3104 is configured to generate a dynamic password with the transaction data, specifically configured to combine a built-in seed key with a third transaction data with a predetermined rule, perform hash operation on the combined data to generate a fix-sized message, subtract data from the message with a predetermined rule, and take the subtracted data in the form of decimal number as the dynamic password.

The transaction image collecting module 3105 is configured to collect a transaction image.

The determining module 3106 is configured to determine whether confirmation information input by a user is received within a predetermined waiting period.

the first storage module 3107 is configured to store the seed key; and specifically, the dynamic token 1 may also include a dynamic factor module for providing a dynamic factor.

The dynamic factor may be an event-based factor or a time-based factor, and correspondingly the dynamic factor module is a counting device or a timer device.

The power module 3108 is configured to supply power to the dynamic token.

At least one of the image converting module, the determining module, and the storage module is integrated with the computing module into one control chip.

The control chip is a security design chip including a smart card chip.

The client side 2 includes a first sending module 3201, a first receiving module 3202, and a first interface module 3203, in which the first sending module 3201 is configured to send the first transaction data and the second dynamic password to the server 3;

the first receiving module 3202 is configured to receive the first transaction data and the second dynamic password input by the user along with the authentication result of the dynamic password from the server 3; and the first interface module 3203 is configured to connect the client side 2 and the server 3.

The server 3 includes a second interface module 3301, a third receiving module 3202, a third sending module 3303, a converting module 3304, a first computing module 3305, a second determining module 3306, a time setting module 3307, a second storage module 3308, and a transaction module 3309, in which the second interface module 3301 is configured to connect the server 3 and the client side 2;

the third receiving module 3302 is configured to receive the first transaction data;

the third sending module 3303 is configured to send the transaction image to the client side 2, and send the authentication result of the dynamic password to the client side 2;

the converting module 3304 is configured to convert the second transaction data into the transaction image with a predetermined rule;

the first computing module 3305 is configured to generate the second dynamic password with the second transaction data;

the second determining module 3306 is configured by the server 3 to determine whether the first dynamic password is identical to the second dynamic password, and to determine whether the time difference is fallen into a predetermined authentication time period;

the time setting module 3307 is configured by the server 3 to set a transaction authentication time period;

the second storage module 3308 is configured to store user information, a seed key, a time of converting the transaction image, and a time of receiving the second dynamic password; and the transaction module 3309 is configured to execute the transaction.

In this embodiment, preferably, the server also includes a time authenticating module being configured to generate a time difference between the time of receiving the second dynamic password and the time of generating the transaction image, and to determine whether the time difference does not exceed a predetermined time period.

The above are just preferred embodiments of the invention, not a limit to the protection scope of the invention, and those skilled in the art should appreciate that any changes or substitutions easy to be thought should be fallen into scope of protection of the invention within the technology scope disclosed by the invention, and therefore the scope of protection of the invention should be based on claims of the invention.

The invention claimed is:

1. An image collection based information security method, comprising:
   Step 1, a server side receiving a first transaction data sent from a client side, and generating a second transaction data with the first transaction data;
   Step 2, the server side converting the second transaction data into a transaction image, and sending the transaction image to the client side;
   Step 3, a dynamic token collecting the transaction image, pre-processing the transaction image and converting the transaction image into a third transaction data, and displaying the third transaction data for a user's confirmation;
   Step 4, combining a built-in seed key with the third transaction data which comprises a transaction amount according to a predetermined rule by the dynamic token;
   performing operation on the combined data to generate a fix-sized message value by the dynamic token;
   subtracting data from the message value with a predetermined rule, and taking a decimal number of the subtracted data as a second dynamic password;
   displaying the second dynamic password by the dynamic token;
   Step 5, the client side receiving the second dynamic password input by the user, and sending the second dynamic password to the server side; and
   Step 6, the server side receiving the second dynamic password, generating a first dynamic password with the second transaction data, and determining whether the first dynamic password is identical to the second dynamic password, if yes, the authentication being successful and transaction being executed; if no, operation being cancelled.

2. The image collection based information security method of claim 1, wherein after Step 3, the method further comprises that the dynamic token determines whether confirmation information input by a user is received within a predetermined waiting period, if yes, Step 4 is executed; if no, the current operation is cancelled.

3. The image collection based information security method of claim 1, wherein the first transaction data in Step 1 refers to a transaction time, a transaction amount, a transaction account number, a transaction address, a transaction password, and/or a random number.

4. The image collection based information security method of claim 1, wherein in Step 1, the server side extracts critical data from the first transaction data with a predetermined rule, and generates second transaction data by the critical data.

5. The image collection based information security method of claim 1, wherein in Step 2, it further comprises that the server records and stores a transaction image conversion time.

6. The image collection based information security method of claim 1, wherein in Step 3, the pre-processing refers to that the collected transaction image is converted by the dynamic token into a digital image with a first process, and the digital image is converted into the third transaction data with a second process.

7. The image collection based information security method of claim 1, wherein in Step 6, the method further comprises that the server side computes a time difference between the time for receiving the second dynamic password and the time for generating the transaction image, and determines whether the time difference does not exceed a predetermined time period, if yes, the transaction is executed; if no, the operation is cancelled.

8. The image collection based information security method of claim 1, wherein in Step 4, the generating the second dynamic password further comprises combining a built-in seed key with the third transaction data by a predetermined rule, performing hash operation on the combined data to generate a fix-sized digest value, and truncate data from the digest value with the predetermined rule, and taking a decimal number of the truncated digest value as the second dynamic password.

9. The image collection based information security method of claim 5, wherein in Step 6, the method further comprises that the server side computes a time difference between the time for receiving the second dynamic password and the time for generating the transaction image, and determines whether the time difference does not exceed a predetermined time period, if yes, executes the transaction; if no, cancels the operation.

10. The image collection based information security method of claim 1, wherein Step 6 further comprises that the server side sends an authentication result to the client side, and if the authentication result is failure, the client side prompts the user of re-inputting the password; if no, the operation is ended.

11. An image collection based information security system, wherein said information security system comprises a dynamic token, a client side, and a server;

the dynamic token being configured to collect a transaction image, convert the transaction image into a third transaction data, generate a second dynamic password by computing according to the third transaction data, and display the second dynamic password wherein the second dynamic password is generated by combining a built-in seed key with the third transaction data which comprises a transaction amount according to a predetermined rule by the dynamic token; performing operation on the combined data to generate a fix-sized message value by the dynamic token; subtracting data from the message value with a predetermined rule; and taking a decimal number of the subtracted data as a second dynamic password;

the client side being configured to communicate with the server, receive or send out transaction data and dynamic password being input by a user; and the server being configured to communicate with the client side, receive a first transaction data, generate a second transaction data with the first transaction data, convert the second transaction data into a transaction image, compute the second transaction data to generate a first dynamic password, receive the second dynamic password, and determine whether the first dynamic password is identical to the second dynamic password.

12. The image collection based information security system of claim 11, wherein the dynamic token comprises a second receiving module, a displaying module, a second image converting module, a second computing module, a transaction image collecting module, a first storage module, and a power module; in which the second receiving module is configured to receive confirmation information input by the user;

the transaction image collecting module is configured to collect the transaction image displayed on the client side screen, for the dynamic token;

the second image converting module is configured to preprocess and convert the transaction image into the third transaction data for the dynamic token;

the second computing module is configured to generate the second dynamic password by computing the third transaction data for the dynamic token;

the displaying module is configured to display the second dynamic password and the third transaction data for the dynamic token;

the first storage module is configured to store a seed key; and the power module is configured to provide working power for the dynamic token.

13. The image collection based information security system of claim 12, wherein the dynamic token comprises a determining module being configured for the dynamic token to determine whether confirmation information input by a user has been received within a predetermined waiting period.

14. The image collection based information security system of claim 11, wherein the server comprises a second interface module, a third receiving module, a third sending module, a conversion module, a first computing module, a second determining module, a second storage module, and a transaction module;

the second interface module is configured to connect the server and the client side;

the third receiving module is configured to receive the first transaction data and the second dynamic password;

the first computing module is configured to generate the second transaction data with the first transaction data, and generate a first dynamic password with the second transaction data;

the conversion module is configured for the server to convert the second transaction data into a transaction image;

the second determining module is configured to determine whether the first dynamic password is identical to the second dynamic password;

the third sending module is configured to send the transaction image to the client side; send the dynamic password authenticating result to the client side; and further determine whether time difference is within authentication time period predetermined by the server;

a time setting module is configured to set a transaction authenticating time for the server;

the second storage module is configured to store user information and a seed key; and the transaction module is configured to execute the transaction.

15. The image collection based information security system of claim 14, wherein the server further comprises a time authenticating module for computing a time difference between the time for receiving the second dynamic password and the time for generating the transaction image, and determining whether the time difference does not exceed the predetermined time period.

* * * * *